United States Patent
Zhang

(10) Patent No.: US 9,313,074 B2
(45) Date of Patent: Apr. 12, 2016

(54) METHOD AND SYSTEM FOR DETECTING FSS BY PEAK THRESHOLD, AND RECEIVER

(75) Inventor: Junling Zhang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 0 days.

(21) Appl. No.: 14/369,520

(22) PCT Filed: Dec. 31, 2011

(86) PCT No.: PCT/CN2011/085182
§ 371 (c)(1),
(2), (4) Date: Jun. 27, 2014

(87) PCT Pub. No.: WO2013/097238
PCT Pub. Date: Jul. 4, 2013

(65) Prior Publication Data
US 2014/0362953 A1  Dec. 11, 2014

(51) Int. Cl.
*H04L 27/26* (2006.01)
*H04B 7/04* (2006.01)
*H04L 25/08* (2006.01)

(52) U.S. Cl.
CPC .......... *H04L 27/2665* (2013.01); *H04B 7/0413* (2013.01); *H04L 25/08* (2013.01)

(58) Field of Classification Search
CPC ............ H04L 27/2665; H04L 27/2662; H04L 25/0212
USPC .......................... 375/340, 349, 267, 355, 362
See application file for complete search history.

(56) References Cited

U.S. PATENT DOCUMENTS

| | | | |
|---|---|---|---|
| 8,031,587 B1 * | 10/2011 | Kang ................. | H04J 11/0063 370/210 |
| 2006/0227748 A1 * | 10/2006 | Stamoulis .......... | H04L 25/0204 370/332 |
| 2008/0239941 A1 | 10/2008 | Gold-Gavriely et al. | |
| 2008/0247476 A1 | 10/2008 | Pirot | |

(Continued)

FOREIGN PATENT DOCUMENTS

| | | |
|---|---|---|
| CN | 101043503 A | 9/2007 |
| CN | 101223753 A | 7/2008 |

(Continued)

OTHER PUBLICATIONS

International Search Report in international application No. PCT/CN2011/085182, mailed on Oct. 18, 2012.
English Translation of the Written Opinion of the International Search Authority in international application No. PCT/CN2011/085182, mailed on Oct. 18, 2012.

*Primary Examiner* — Sophia Vlahos
(74) *Attorney, Agent, or Firm* — Oppedahl Patent Law Firm LLC

(57) ABSTRACT

A method and system for detecting FSS by a peak threshold, and a receiver include: a peak search module configured to perform peak search on a set of inputted CIR average values to obtain a set of CIR peaks; a threshold generation module configured to search for a maximum value from the obtained set of CIR peaks, obtain an FSS search threshold according to the maximum value and a preset threshold, and provide the FSS search threshold to an FSS detection module; and the FSS detection module configured to utilize the FSS search threshold to detect an FFT windowing position of a receiving antenna. The technical solutions according to the disclosure improve the protection capability from exceptions for FSS detection while reducing the detection complexity of FSS.

10 Claims, 3 Drawing Sheets

(56) References Cited

U.S. PATENT DOCUMENTS

| | | | |
|---|---|---|---|
| 2008/0279292 A1* | 11/2008 | Tanabe | H04L 5/0051 375/260 |
| 2010/0074348 A1 | 3/2010 | Xu | |
| 2010/0142659 A1 | 6/2010 | Gold-Gavriely | |
| 2011/0149943 A1* | 6/2011 | Srinivasan | H04L 25/0212 370/343 |

FOREIGN PATENT DOCUMENTS

| | | |
|---|---|---|
| CN | 101686216 A | 3/2010 |
| CN | 101848180 A | 9/2010 |

* cited by examiner

METHOD AND SYSTEM FOR DETECTING FSS BY PEAK THRESHOLD, AND RECEIVER

TECHNICAL FIELD

The disclosure relates to the field of wireless communications, and more particularly to a method and system for detecting Fine Symbol Synchronization (FSS) by a peak threshold, and a receiver.

BACKGROUND

FIG. 1 is a synchronization principle diagram illustrating FSS in a Long Term Evolution (LTE) system in the prior art. As shown in FIG. 1, an over-the-air signal received by a receiver is sent to a Reference Signal (RS) extracting and descrambling module via a Radio Frequency (RF) identification module and a Fast Fourier Transformation (FFT) module to generate RS signal sets $\{RS(l)\}_{0x}$ and $\{RS(l)\}_{1x}$ respectively on lth Orthogonal Frequency Division Multiplexing (OFDM) symbols on a receiving antenna 0-transmitting antenna x pair and a receiving antenna 1-transmitting antenna x pair. Each receiving-transmitting antenna pair sends the RS signal sets $\{RS(l)\}_{0x}$ and $\{RS(l)\}_{1x}$ of the lth OFDM) symbol into an Inverse Discrete Fourier Transform (IDFT) module to respectively perform operation, and performs calculation of modulus on an operation result of the IDFT module to obtain Channel Impulse Response (CIR) estimations $\{CIR(l)\}_{0x}$ and $\{CIR(l)\}_{1x}$ of the lth OFDM symbol on each receiving-transmitting antenna pair. Here, the calculation of modulus is performed on the operation result of the IDFT module to avoid performance degradation caused by coherent accumulation under an actual fast fading channel. In order to increase the Signal-to-Noise Ratio (SNR) of the CIR estimations $\{CIR(l)\}_{0x}$ and $\{CIR(l)\}_{1x}$, 'continuous' $\{CIR(l+\bullet)\}_{0x}$ and $\{CIR(l+\bullet)\}_{1x}$ will be generally accumulated by a time accumulator to obtain $\{CIR_{ave}\}_{0x}$ and $\{CIR_{ave}\}_{1x}$, which are inputted to a subsequent FSS detection module. The FSS detection module detects an FFT windowing initial point startnx of a receiving antenna n on each receiving-transmitting antenna pair independently, and defines forward shift of an FFT window as a negative value, and backward shift of the FFT window as a positive value. All transmitting antenna port detection results on one transmitting antenna port are sent to an FSS combining module to generate an FFT initial point startn of a certain receiving antenna port. A synthetic FFT initial point startn of each receiving antenna generates a final FFT initial point control signal FFT_startn to the FFT module eventually through a loop filter.

A conventional method for detecting FSS is to perform threshold search, peak search push-forward or calculation of center of gravity push-forward etc. on a CIR time accumulation result $\{CIR_{ave}\}_{nx}$ each receiving-transmitting antenna pair. Generally, a subsequent Rxn FSS combining module simply searches for and outputs a minimum in $\{startnx\}$.

When the conventional method for detecting FSS and the combining method are applied in an LTE Multiple-Input and Multiple-Output (MIMO) system, a relatively large error will be caused in the case of a power abnormality of a certain transmitting antenna. For example, in a laboratory test, a receiver is configured with N transmitting antennas and two receiving antennas. However, a cable is really only connected on Rx0-Tx0 and Rx1-Tx1 antenna pairs. An FSS detection result of Rx0-Tx1~N-1 antenna pairs without a cable is substantially a random number, which will seriously interfere with a output of the FSS combining module, thereby increasing a startn output noise. In an actual outfield test, since extremely low power of a certain transmitting antenna port m is caused by abnormality of a base station, the SNR of a CIR time accumulation result on a Rxn-Txm antenna pair is affected, thus increasing the output noise during FSS detection.

SUMMARY

In view of this, the disclosure provides a method and system for detecting FSS by a peak threshold, and a receiver, so as to improve the protection capability from exceptions by FSS detection while reducing FSS detection complexity.

To this end, a technical solution of the disclosure is implemented as follows.

A system for detecting FSS by a peak threshold includes a peak search module, a threshold generation module and an FSS detection module, wherein the peak search module is configured to perform peak search on a set of inputted CIR average values to obtain a set of CIR peaks;

the threshold generation module is configured to search for a maximum value from the obtained set of CIR peaks, and obtain an FSS search threshold according to the maximum value and a preset threshold; and the peak search module is configured to utilize the FSS search threshold to detect an FFT windowing position of a receiving antenna.

The peak search module may be configured to:

perform the peak search on the set $\{CIR_{ave}(i)\}$ of CIR average values processed by a time accumulator to obtain the set peakmn of CIR peaks on a receiving-transmitting antenna pair mn, wherein $$peakmn = \max_i\{\{CIR_{ave}(i)\}_{mn}\},$$

where $m=\{0,1\}$, $n=\{0,1,\ldots,N-1\}$, and a value range of i is determined by an output of an Inverse Discrete Fourier Transform (IDFT) module inputting a value into the time accumulator.

The threshold generation module may be configured to:

search for the maximum value from the obtained set peakmn of CIR peaks, and obtain a CIR peak peakmn on a receiving-transmitting antenna pair mn, wherein $$peakm = \max_n\{peakmn\},$$

where $m=\{0,1\}$, and $n=\{0,1,\ldots,N-1\}$.

The threshold generation module may be configured to: obtain the FSS search threshold thm according to the maximum value and the preset threshold th, wherein $thm=th\times peakm$, where $m=\{0,1\}$.

The peak search module may be configured to: utilize the FSS search threshold thm provided by the threshold generation module to detect the FFT windowing position of the receiving antenna m independently on each receiving-transmitting antenna pair mn.

A method for detecting FSS by a peak threshold includes that: peak search is performed on a set of inputted CIR average values to obtain a set of CIR peaks; a maximum value is searched for from the obtained set of CIR peaks, and an FSS search threshold is obtained according to the maximum value and a preset threshold; and the FSS search threshold is utilized to detect an FFT windowing position of a receiving antenna.

The operation that peak search is performed on a set of inputted CIR average values to obtain a set of CIR peaks may include that:

the peak search is performed on the set $\{CIR_{ave}(i)\}$ of CIR average values processed by a time accumulator to obtain the set peakmn of CIR peaks on a receiving-transmitting antenna pair mn, wherein $$peakmn = \max_i\{\{CIR_{ave}(i)\}_{mn}\},$$

where m={0,1}, n={0,1, ..., N−1}, and a value range of i is determined by an output of an IDFT module inputting a value into the time accumulator.

The operation that a maximum value is searched for from the obtained set of CIR peaks may include that:

the maximum value is searched for from the obtained set peakmn of CIR peaks, and a CIR peak peakm is obtained on a receiving-transmitting antenna pair mn, wherein $$peakm = \max_n\{peakmn\},$$

where m={0,1}, and n={0,1, ..., N−1}.

The operation that an FSS search threshold is obtained according to the maximum value and a preset threshold may include that: the FSS search threshold thm is obtained according to the maximum value and the preset threshold th, wherein thm=th×peakm, where m={0,1}.

The operation that the FSS search threshold is utilized to detect an FFT windowing position of a receiving antenna may include that: the FSS search threshold thm provided by the threshold generation module is utilized to detect the FFT windowing position of the receiving antenna m independently on each receiving-transmitting antenna pair mn.

According to a method and system for detecting FSS by a peak threshold, and a receiver provided by the disclosure, a peak search module is configured to perform peak search on a set of inputted CIR average values to obtain a set of CIR peaks; a threshold generation module is configured to search for a maximum from the obtained set of CIR peaks, obtain an FSS search threshold according to the maximum value and a preset threshold, and provide the FSS search threshold to an FSS detection module; and the FSS detection module is configured to utilize the FSS search threshold to detect an FFT windowing position of a receiving antenna. The disclosure automatically selects a transmitting port with a relatively high SRN on a receiving antenna as the reference of all FSS search thresholds on the receiving antenna, thus abnormally low power and no transmitting power of a certain transmitting port can be avoided, and the protection capability from exceptions for FSS detection is improved while reducing the FSS detection complexity.

DETAILED DESCRIPTION

The basic idea of the disclosure is that: a peak search module is configured to perform peak search on a set of inputted CIR average values to obtain a set of CIR peaks; a threshold generation module is configured to search for a maximum value from the obtained set of CIR peaks, obtain an FSS search threshold according to the maximum value and a preset threshold, and provide the FSS search threshold to an FSS detection module; and the FSS detection module is configured to utilize the FSS search threshold to detect an FFT windowing position of a receiving antenna.

The disclosure is further elaborated below through the accompanying drawings and specific embodiments.

Figure 1:
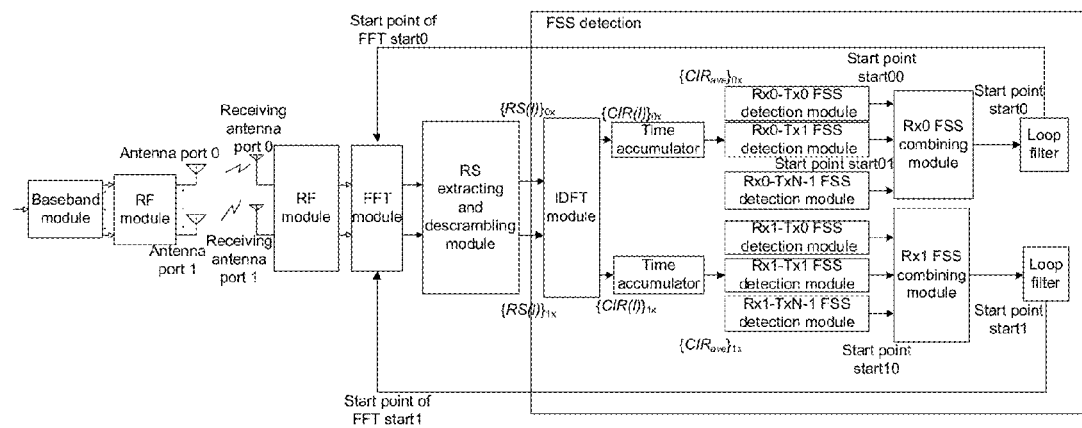
FIG. 1 is a synchronization principle diagram illustrating FSS in an LTE system in the prior art.
Figure 2:
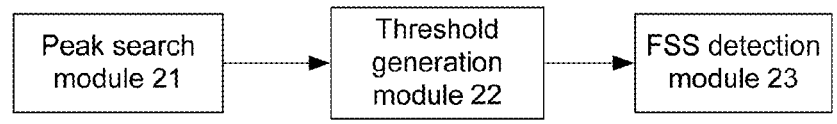
FIG. 2 is a structural diagram illustrating implementation of a system for detecting FSS by a peak threshold according to the disclosure.

The disclosure provides a system for detecting FSS by a peak threshold. The system is applied in a receiver of an LTE system, and may be also applicable to other systems or devices using OFDM MIMO. FIG. 2 is a structural diagram illustrating implementation of a system for detecting FSS by a peak threshold according to the disclosure. As shown in FIG. 2, the system includes: a peak search module 21, a threshold generation module 22 and an FSS detection module 23, wherein the peak search module 21 is configured to perform peak search on a set of inputted CIR average values to obtain a set of CIR peaks;

the threshold generation module 22 is configured to search for a maximum value from the obtained set of CIR peaks, and obtain an FSS search threshold according to the maximum value and a preset threshold; and the peak search module 23 is configured to utilize the FSS search threshold to detect an FFT windowing position of a receiving antenna.

The operation that the peak search module 21 performs peak search on a set of inputted CIR average values to obtain a set of CIR peaks includes that: the peak search module 21 performs the peak search on the set $\{CIR_{ave}(i)\}$ of CIR average values processed by a time accumulator to obtain the set peakmn of CIR peaks on a receiving-transmitting antenna pair mn, $$peakmn = \max_i\{\{CIR_{ave}(i)\}_{mn}\},$$

where m={0,1}, n={0,1, ..., N−1}, and a value range of i is determined by an output of an Inverse Discrete Fourier Transform (IDFT) module inputting a value into the time accumulator.

The operation that the threshold generation module 22 searches for a maximum value from the obtained set of CIR peaks includes that: the threshold generation module searches for the maximum value from the obtained set peakmn of CIR peaks, and obtains a CIR peak peakm on a receiving-transmitting antenna pair mn, $$peakm = \max_n\{peakmn\},$$

where m={0,1}, and n={0,1, ..., N−1}.

The operation that the threshold generation module 22 obtains an FSS search threshold according to the maximum value and a preset threshold includes that: the threshold generation module obtains the FSS search threshold thm according to the maximum value and the preset threshold th, thm=th×peakm, where m={0,1}.

The operation that the peak search module 23 utilizes the FSS search threshold to detect an FFT windowing position of a receiving antenna includes that: the peak search module utilizes the FSS search threshold thm provided by the threshold generation module to detect the FFT windowing position of the receiving antenna m independently on each receiving-transmitting antenna pair mn.

Figure 3:
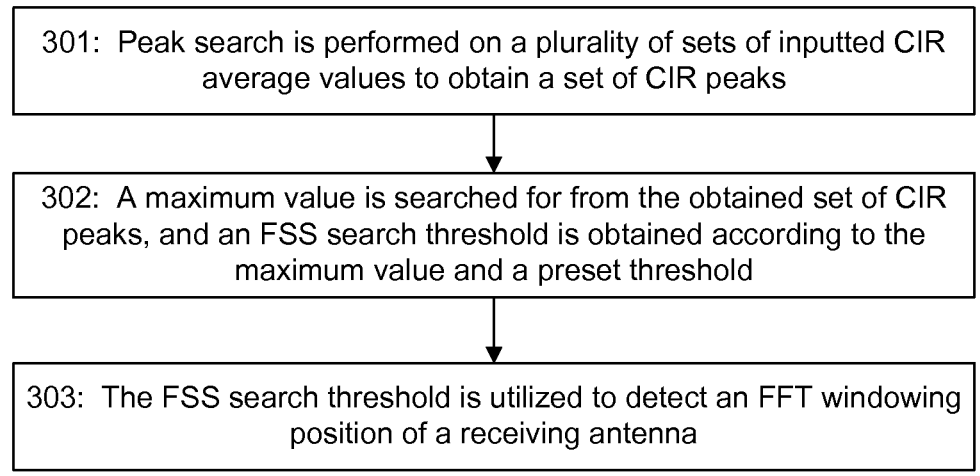
FIG. 3 is a flowchart illustrating implementation of a method for detecting FSS by a peak threshold according to the disclosure.

Based on the above system, the disclosure further provides a method for detecting FSS by a peak threshold. FIG. 3 is a flowchart illustrating implementation of a method for detecting FSS by a peak threshold according to the disclosure. As shown in FIG. 3, the method includes:

Step 301: Peak search is performed on a set of inputted CIR average values to obtain a set of CIR peaks.

Figure 4:
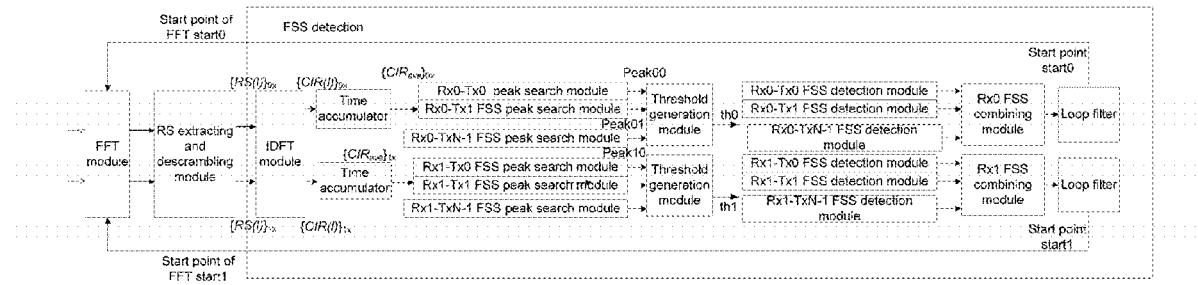
FIG. 4 is a synchronization principle diagram illustrating FSS in an LTE system according to the disclosure.

Specifically, as shown in FIG. 4, the disclosure takes a receiver having N transmitting antennas and two receiving antennas and a signal on a receiving antenna m for an example; and a peak search module performs the peak search on the set $\{CIR_{ave}(i)\}$ of peak average values processed by a time accumulator to obtain a set peakmn of CIR peaks on a receiving-transmitting antenna pair mn, i.e., $$peakmn = \max_i\{\{CIR_{ave}(i)\}_{mn}\},$$

where m={0,1}, and n={0,1, . . . , N−1}, the value range of i is determined by an output of an IDFT module inputting a value into the time accumulator. For example, when 2048-point IDFT is selected, the output of IDFT is 0,1, . . . , 2047, then the value of i ranges from 0 to 2047.

Step 302: A maximum value is searched for from the obtained set of CIR peaks, and an FSS search threshold is obtained according to the maximum value and a preset threshold.

Specifically, the threshold generation module firstly searches for the maximum from N peaks in the receiving antenna m, i.e., the threshold generation module searches for the maximum from the obtained CIR peak set peakmn and obtains the CIR peak peakm, i.e., $$peakm = \max_n\{peakmn\}$$

on a receiving-transmitting antenna pair mn, where m={0,1}, and n={0,1, . . . , N−1}. The threshold generation module obtains the FSS search threshold th, i.e., thm=th×peakm, according to the maximum value and the preset threshold th, where m={0,1}. The threshold generation module provides the obtained FSS search threshold thm to all FSS detection modules on the receiving antenna.

Step 303: The FSS search threshold is utilized to detect an FFT windowing position of a receiving antenna.

Figure 5:
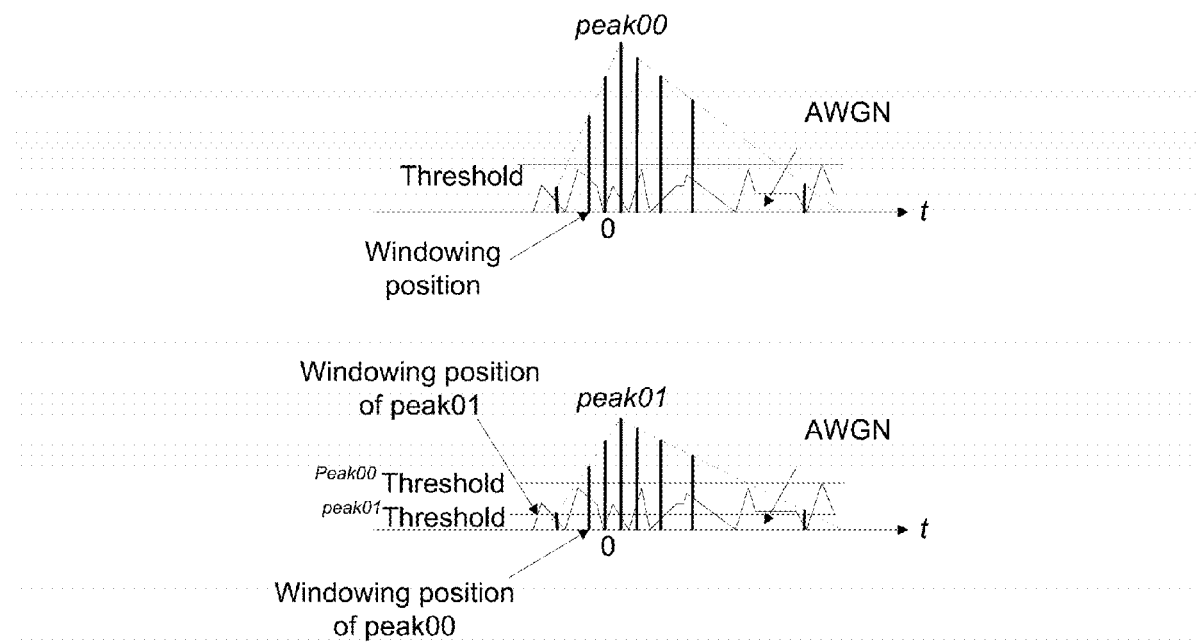
FIG. 5 is a schematic diagram illustrating comparison between a method for detecting FSS according to the disclosure and a conventional method for detecting FSS.

Specifically, the FSS detection module utilizes the FSS search threshold thm provided by the threshold generation module to detect an FFT windowing position startnx of the receiving antenna m independently on each receiving-transmitting antenna pair mn. For example, by taking a CIR signal on a receiving antenna 0 of a 2×2 MIMO receiver for an example, FIG. 5 is a schematic diagram illustrating comparison between a method for detecting FSS according to the disclosure and a conventional method for detecting FSS. As shown in FIG. 5, peak01<peak00. In the conventional method for detecting FSS, since the peak01 is relatively small, an FSS search threshold of $CIR_{01}$ obtained by a preset threshold th is also relatively small, such that an FFT windowing position detected by the FSS detection module is a false path generated by Additive White Gaussian Noise (AWGN), thereby resulting in a relatively large variance of the FSS detection module on $CIR_{01}$ and increasing the output variance of a subsequent FSS combining module. By using the technical solutions provided by the disclosure, the FSS detection module uses the FSS search threshold generated by peak00 and a preset threshold th, thus preventing an AWGN false path on $CIR_{01}$ from being searched and improving the overall performance of FSS.

The above are only the preferred embodiments of the disclosure, and are not be intended to limit the scope of protection of the claims of the disclosure. Any modifications, equivalent replacements, improvements and the like made within the spirit and principle of the disclosure shall fall within the scope of protection of the claims of the disclosure.

The invention claimed is:

1. A system for detecting Fine Symbol Synchronization (FSS) by a peak threshold, comprising: a peak search module, a threshold generation module and an FSS detection module, wherein
    the peak search module is configured to perform peak search on a plurality of sets of inputted Channel Impulse Response (CIR) average values to obtain a set of CIR peaks, each set of CIR average values corresponding to a receiving-transmitting antenna pair, each CIR peak being selected from its respective set of CIR average values;
    the threshold generation module is configured to search for a maximum value from the obtained set of CIR peaks, and obtain an FSS search threshold according to the maximum value and a preset threshold; and
    the FSS detection module is configured to utilize the FSS search threshold to detect a Fast Fourier Transformation (FFT) windowing position on a signal received by a receiving antenna.

2. The system according to claim 1, wherein the peak search module is configured to:
    perform the peak search on each set $\{CIR_{ave}(i)\}$ of CIR average values processed by a time accumulator to obtain the set peakmn of CIR peaks on a receiving-transmitting antenna pair mn, wherein $$peakmn = \max_i\{\{CIR_{ave}(i)\}_{mn}\},$$

where m={0,1}, and n={0,1, . . . , N−1}, and a value range of i is determined by an output of an Inverse Discrete Fourier Transform (IDFT) module inputting a value into the time accumulator;
    wherein m indicates a receiving antenna index and is equal to one of the numbers in the brackets, n indicates a transmitting antenna index and is equal to one of the numbers in the brackets, mn indicates a receiving-transmitting antenna pair index, and N indicates a total number of transmitting antennas.

3. The system according to claim 1, wherein the threshold generation module is configured to:
    search for the maximum value from an obtained set peakmn of CIR peaks, and obtain a CIR peak peakm on a receiving-transmitting antenna pair mn, wherein $$peakm = \max_n\{peakmn\},$$

where m={0,1}, and n={0,1, . . . , N−1};
    wherein m indicates a receiving antenna index and is equal to one of the numbers in the brackets, n indicates a transmitting antenna index and is equal to one of the numbers in the brackets, mn indicates a receiving-transmitting antenna pair index, and N indicates a total number of transmitting antennas.

4. The system according to claim 1, wherein the threshold generation module is configured to:
   obtain an FSS search threshold thm according to the maximum value and a preset threshold th, wherein thm=th×peakm, where m ={0,1};
   wherein m indicates a receiving antenna index and is equal to one of the numbers in the brackets.

5. The system according to claim 1, wherein the peak search module is configured to:
   utilize an FSS search threshold thm provided by the threshold generation module to detect the FFT windowing position on a signal received by a receiving antenna m independently on a receiving-transmitting antenna pair mn;
   wherein m indicates a receiving antenna index, and mn indicates a receiving-transmitting antenna pair index.

6. A method for detecting Fine Symbol Synchronization (FSS) by a peak threshold, comprising:
   performing, by a peak search module, peak search on a plurality of sets of inputted Channel Impulse Response (CIR) average values to obtain a set of CIR peaks, each set of CIR average values corresponding to a receiving-transmitting antenna pair, each CIR peak being selected from its respective set of CIR average values;
   searching, by a threshold generation module, for a maximum value from the obtained set of CIR peaks, and obtaining an FSS search threshold according to the maximum value and a preset threshold; and
   utilizing, by an FSS detection module, the FSS search threshold to detect a Fast Fourier Transformation (FFT) windowing position on a signal received by a receiving antenna.

7. The method according to claim 6, wherein the step of performing peak search on a plurality of sets of inputted CIR average values to obtain a set of CIR peaks comprises:
   performing the peak search on each set $\{CIR_{cave}(i)\}$ of CIR average values processed by a time accumulator to obtain a set peakmn of CIR peaks on a receiving-transmitting antenna pair mn, wherein $$peakmn = \max_{i}\{\{CIR_{ave}(i)\}_{mn}\},$$

where m={0,1}, n={0,1,...,N−1}, and a value range of i is determined by an output of an Inverse Discrete Fourier Transform (IDFT) module inputting a value into the time accumulator;
wherein m indicates a receiving antenna index and is equal to one of the numbers in the brackets, n indicates a transmitting antenna index and is equal to one of the numbers in the brackets, mn indicates a receiving-transmitting antenna pair index, and N indicates a total number of transmitting antennas.

8. The method according to claim 6, wherein the step of searching for a maximum value from the obtained set of CIR peaks comprises:
   searching for the maximum value from an obtained set peakmn of CIR peaks, and obtaining a CIR peak peakm on a receiving-transmitting antenna pair mn, wherein $$peakm = \max_{n}\{peakmn\},$$

where m ={0,1}, and n={0,1,...,n−1};
wherein m indicates a receiving antenna index and is equal to one of the numbers in the brackets, n indicates a transmitting antenna index and is equal to one of the numbers in the brackets, mn indicates a receiving-transmitting antenna pair index, and N indicates a total number of transmitting antennas.

9. The method according to claim 6, wherein the step of obtaining an FSS search threshold according to the maximum value and a preset threshold comprises:
   obtaining an FSS search threshold thm according to the maximum value and a preset threshold th, wherein thm =th×peakm, where m ={0,1};
   wherein m indicates a receiving antenna index and is equal to one of the numbers in the brackets.

10. The method according to claim 6, wherein the step of utilizing the FSS search threshold to detect an FFT windowing position on a signal received by a receiving antenna comprises:
   utilizing an FSS search threshold thm provided by the threshold generation module to detect the FFT windowing position on a signal received by a receiving antenna m independently on a receiving-transmitting antenna pair mn;
   wherein m indicates a receiving antenna index, and mn indicates a receiving-transmitting antenna pair index.

\* \* \* \* \*